Dec. 28, 1965  R. P. HOLLAND, JR  3,226,056
MULTIPLE SPAN AIRCRAFT
Filed July 12, 1950  2 Sheets-Sheet 1
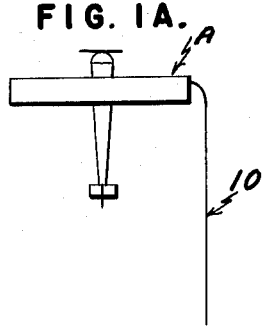
FIG. 1A.
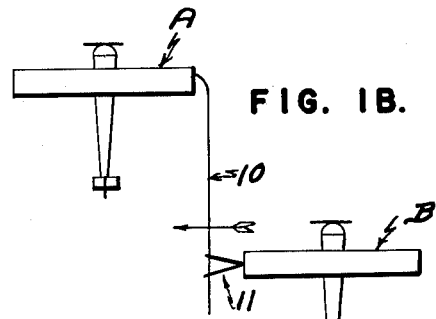
FIG. 1B.
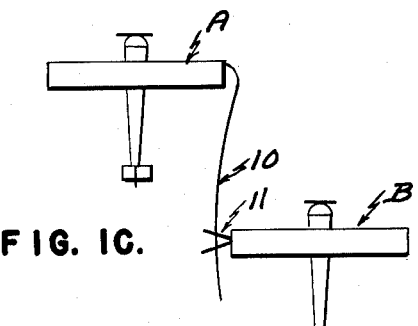
FIG. 1C.
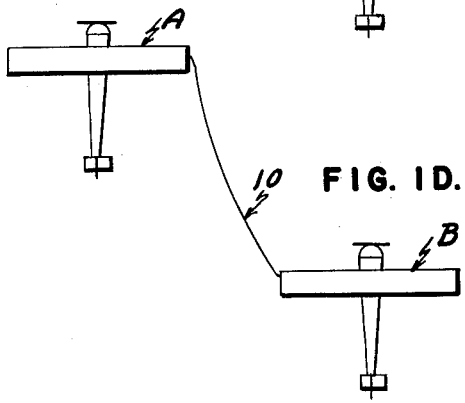
FIG. 1D.
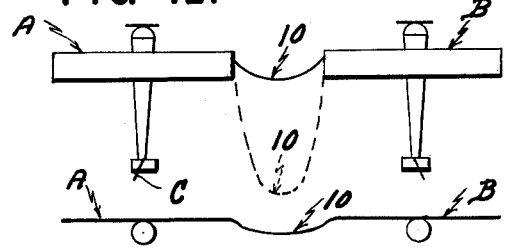
FIG. 1E.
FIG. 1F.
FIG. 1G.
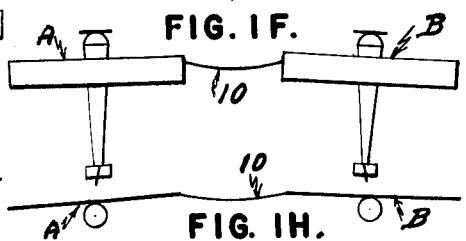
FIG. 1H.
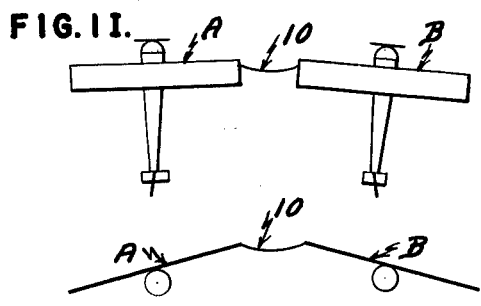
FIG. 1I.
FIG. 1K.
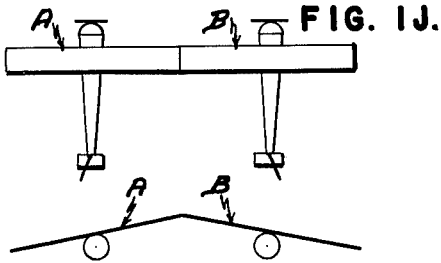
FIG. 1J.
FIG. 1L.
INVENTOR.
RAYMOND P. HOLLAND JR.
BY
Semmes, Keegin, Robinson & Semmes
ATTORNEYS Dec. 28, 1965 R. P. HOLLAND, JR 3,226,056
MULTIPLE SPAN AIRCRAFT
Filed July 12, 1950 2 Sheets-Sheet 2
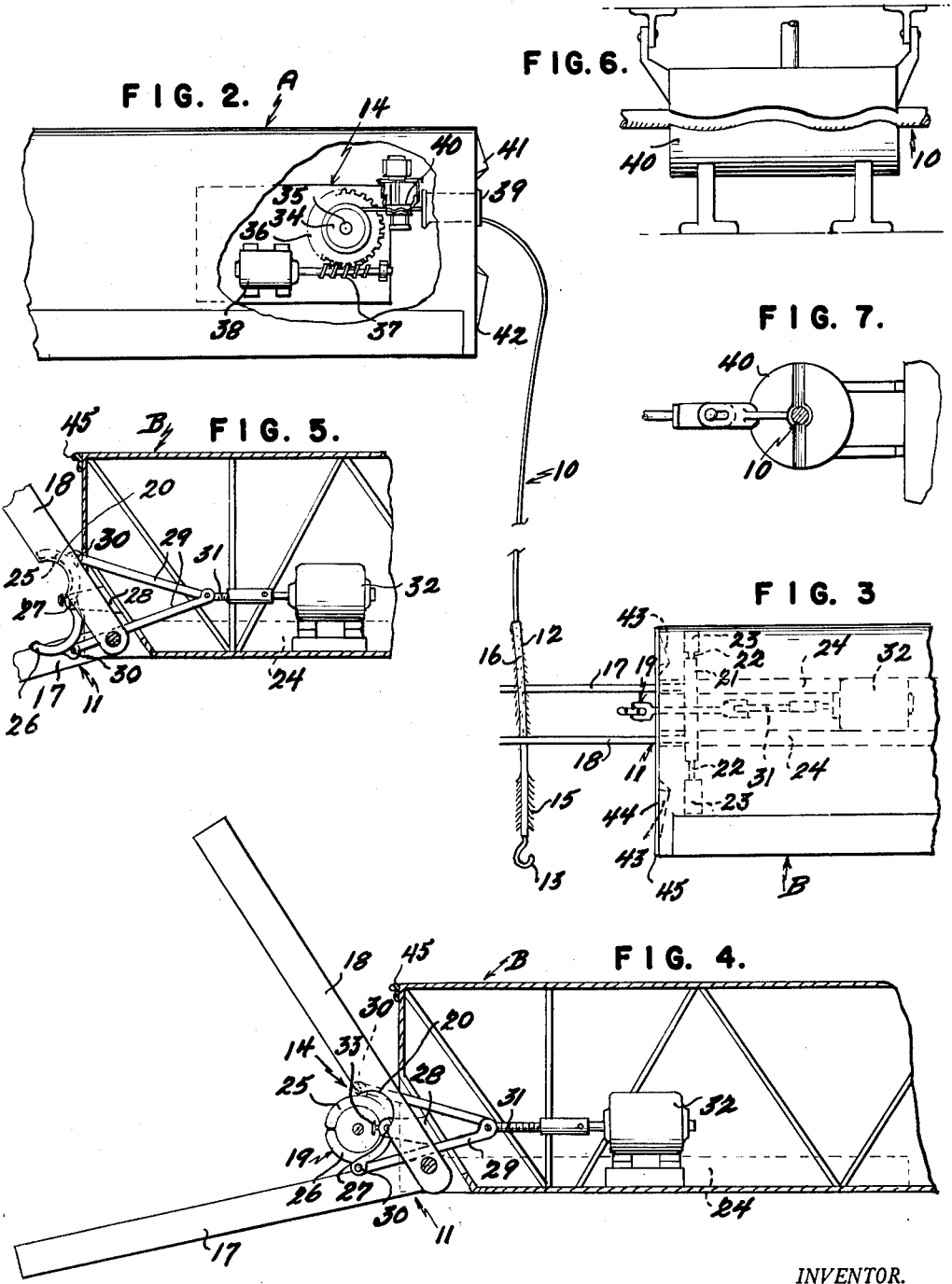
INVENTOR.
RAYMOND P. HOLLAND JR.
BY
ATTORNEYS

United States Patent Office 3,226,056
Patented Dec. 28, 1965

3,226,056
MULTIPLE SPAN AIRCRAFT
Raymond P. Holland, Jr., 421 W. College Blvd.,
Roswell, N. Mex.
Filed July 12, 1950, Ser. No. 173,438
12 Claims. (Cl. 244—2)

The present invention relates to improvements in the construction and design of aircraft, and has particular reference to the grouping of individual aircraft into a multiple unit or flight group, wherein individual components of the multiple unit may be assembled or linked, as well as detached, from other components of the group, in flight.

The matter of the flying range of aircraft is a key consideration in military and commercial air operations today, setting the direction and pattern of development in terms of logistic and strategic requirements. The range and altitude capabilities of aircraft are primary considerations in military defense planning operations. At the present time, these capabilities are limited more by mechanical considerations than by aerodynamics. For example, it is well known that an increase in the wing span of an aircraft will increase the range and altitude capabilities up to the point where the wing structure becomes so heavy as to offset the aerodynamic gain. Partial solutions to this problem have been found in the distribution of a part of the weight of the aircraft over the wing span, as, for example, by using wing tip fuel tanks. This direction of development has effective limitations, however, in that the landing conditions dictate against maximum possible distribution of weight over the wing span.

Accordingly, there has been no effective solution to accomplishment of the special aerodynamic advantages of the long wing span without sacrifice of other equally desirable qualities of the craft. It is an object of the present invention to provide an effective, practical solution to the problem, embodying little change in the basic design of aircraft.

A further object of the invention is to provide an aircraft lifting system which consists of an aggregate of independently operated lifting surfaces linked together to form an aerodynamically continuous lifting surface.

A further object is to provide a multiple craft unit consisting of a plurality of individual aircraft which may enjoy conventional free flight in the takeoff and the landing, the individual aircraft being linked together in flight to provide a single continuous wing span with maximum beneficial distribution of weight over the span.

A further object is to provide a novel mechanical linkage system for securing a plurality of aircraft together spanwise in flight, augmenting the individual performance values of the aircraft, the flight efficiency of the linked group increasing as the number of individual participating craft increases.

A further object is means for accomplishing a concentrated grouping of aircraft linked in fleet formation, increasing the range and elevational capabilities of the craft as well as simplifying and facilitating fueling of individual craft, interplane transfer of material, persons, intelligence, etc. in flight.

A further object is to provide an effective means for accomplishing and maintaining high altitude subsonic flight for short winged aircraft normally unsuited thereto of especial value incident to transition at those high altitudes to trans-sonic or supersonic flight.

A further object of the invention is to provide means for reducing the induced drag of aircraft.

A further object is to accomplish a reduction of induced drag of aircraft in flight, thereby benefiting all phases of flight performance when the lift coefficient is relatively large, i.e., where the induced drag is a relatively large part of the total drag of the aircraft.

A further object of the invention is to provide means for materially increasing the range, altitude, speed at altitude, and other performance capabilities of conventional aircraft.

A further object is to provide a linkage system for joining aircraft in flight which is incapable of transmitting destructive loads from one element of a linked fleet to another.

Other objects and advantages of the invention will be apparent from the following detailed description thereof taken in connection with the drawings, wherein:

FIGURES 1A through 1L are diagrammatic views showing the various operational stages in the attachment of two aircraft in flight, in wing tip to wing tip relationship;

FIGURE 2 is a view in vertical elevation, partially broken away in cross-section, of a preferred form of mechanism for linking aircraft in flight and showing the linking cable extended;

FIGURE 3 is a top plan view of a wing of a craft with means for grasping the cable;

FIGURE 4 is a view in cross-section showing the cable guide arms on the wing tip of the aircraft and the positioning thereof relative to the means for seizing the cable;

FIGURE 5 is a view of the preferred means for securing the cable, in open or cable receiving position;

FIGURE 6 is a plan view of the cable securing mechanism in closed position; and

FIGURE 7 is a view in side elevation of the cable securing mechanism in open position.

In its broadest application, the present invention comprises a plurality of aircraft of any type, size or proportion, arranged in wing tip to wing tip relationship without appreciable air gap therebetween, whereby the wings of the plurality of craft cooperate to form a single wing having a long span in relation to its area. The invention further provides a preferred mechanism for accomplishing the attachment of aircraft wing tips in flight, and release of the attachment in flight.

In aircraft of conventional design, the free space beyond the wing tips permits the escape of lifting pressures, which loss normally is compensated by tilting the wing at a steeper lifting angle to restore the lost lifting power. The tilt of the wing incurs induced drag, which acts in a manner similar to an increase in weight of the craft, with regard to level non-accelerated flight performance characteristics. The present invention accomplishes the reduction of induced drag in such magnitude as to materially increase the range and otherwise improve the flight characteristics of aircraft of otherwise conventional design.

When one airplane is joined to another without air leakage, at wing tips having appreciable chord width, both craft being identical in construction, the wings being aerodynamically clean and remaining at the same lift coefficient after joining as before joining, the total induced drag of the two craft will be approximately the same after joining as the induced drag of the individual plane before joining. Thus, the induced drag of the individual plane is reduced roughly one-half, when the plane is joined to another. Stating the principle broadly, induced drag is reduced in accordance with the formula $1/N$, N being the number of planes joined and representing any number.

It is significant that conventional long range aircraft, to achieve maximum flight ranges, fly at a lift coefficient such that roughly one-half of the total drag is induced drag. Thus, by joining the wing tips of two long range craft with the lift coefficient remaining the same, the total drag will be reduced to three quarters of the former drag figure, enabling a given supply of fuel to accomplish 1⅓ the range of an individual plane. Similarly, when six planes are joined, a range of 1⁵⁄₇ of the original range is accomplished.

The maximum range will be somewhat greater than these figures and will be accomplished by flying at lift coefficients somewhat higher than in the cases immediately above. Under ideal optimum conditions, the maximum range is increased by a factor $\sqrt{N}$, where N is the number of planes joined. This generalization is limited, however, by the onset of flow separations at the higher lift coefficients.

A corresponding increase in maximum flight elevation also results from linking, although the benefits are not as simply stated as with range, due to the complexity of the factors affecting high altitude flight.

Referring now to FIGURE 1 of the drawings, there is shown in sequence, a series of operations incident to the joining or linking of two aircraft, in flight. The linking operations are shown as embodying two planes referred to as A and B, each plane A being provided with a cable mechanism 10 and each plane B being provided with a cable securing mechanism referred to generally as 11. A detailed description of preferred embodiments of the cable mechanisms 10 and 11 and the operation thereof is set forth hereinafter.

When it is desired to accomplish the connection of two or more planes, each plane A in proper sequence reels out the cable 10 from its right wing tip, the cable trailing rearwardly of the plane in a substantially horizontal position. When this is accomplished and with plane A holding a straight course, plane B operates the cable connecting mechanism 11 so that it protrudes from the left wing tip of the plane B, and gradually moves in toward the trailing cable 10 in the direction of the arrow in FIGURE 1B. Movement of the plane B is accomplished whereby the connecting mechanism 11 is brought into engagement with the cable 10 as shown in FIGURE 1C, preferably in advance of the end of the cable, whereupon the cable is secured to the plane B and positions taken by the planes as shown in FIGURE 1D. The planes A and B then gradually assume positions off each other's wing tips as shown in FIGURE 1E. The air drag on the cable connecting the two wing tips produces a sag in the cable which decreases the likelihood of jerking. The air drag acting through the cable tension also tends to turn the two planes slightly toward each other. The drag of the cable on respective wing tips of the planes is compensated for by rudder action as shown at C in FIGURE 1E. At this point, the cable 10 will be in a relatively slack position as is shown in two positions in FIGURE 1E, the wings of the respective planes being on a substantially horizontal plane as shown in FIGURE 1G. The slack in the cable 10 is then taken up, as shown in FIGURE 1F. As the cable straightens and the planes move toward each other, they bank slightly away from each other as shown in FIGURE 1H, putting increased tension on the cable 10, an action partly due to a natural effect to be described. They also tend to take headings slightly apart from each other as shown in FIGURE 1F and FIGURE 1I. This is due to a decreasing of the cable drag as less is exposed, which decreases the need for rudder action, but which rudder action is nevertheless purposely maintained. The cable reeling mechanism in plane A prevents either slacking or jerking of the cable as it is withdrawn into the plane A, producing a deliberate and steady approach. Due to the banked and yawed position of both planes as the cable shortens, it will be noted that the planes are in position to effect an immediate separation without any change in control setting as shown in FIGURES 1I and 1K, should release be desirable due, for example, to unexpected wind gusts. Reeling of the cable 10 is continued until the adjacent wing tips of the planes A and B are drawn together in a position shown in FIGURE 1J, whereupon the wing tips are positively secured in a manner to be described.

It will be noted that as the wing tips of the two planes approach final junction, the lift builds up on the adjacent wing tips, creating a natural tendency for the two planes to roll away from each other slightly, and check any inward momentum they may have. When two or more planes have been joined, due to the relative inertia of the joined planes in flight compared with a single plane B the attachment of additional planes is simplified insofar as individual piloting of the plane is concerned, it being only necessary that the pilot of each plane B maneuver carefully in the manner shown in the sequence of drawings in FIGURE 1 until positive attachment of his plane to the group has been accomplished.

As to the specific devices employed for accomplishing the joining of aircraft in flight, it will be appreciated that the positioning of the connecting means on the planes A and B may be varied, as by reversal of wing position, substitution of parts, and the like. It will be further observed that the details of mechanical structure described hereinafter constitute one preferred embodiment for carrying out the invention, and may be varied considerably in design, structural detail and arrangement without departing from the spirit of the invention. The structure to be described is set forth with maximum simplicity and it is contemplated that this plane connecting structure may be employed in combination with flight controls of various types necessary to impart desired flight flexibility and stability to the flight group, as well as means for effecting communication between planes, the transfer of fuel and the like.

Thus, the present invention resides primarily in the provision of means for establishing positive contact between and linking two or more planes in flight, including mechanism for establishing initial contact between two planes and for joining the two planes together in wing tip to wing tip position, forming the planes in a single flight unit which attains the described benefits of the invention.

Referring now to FIGURE 2 of the drawings, the positive contact means is shown therein as a simple form of cable reel mechanism designated generally as 14 positioned within the wing tip of plane A, shown as the right hand wing tip, for operation of the cable 10. The cable, which is shown in trailing or contact position, preferably may be composed of a light weight cord facilitating handling of the cable, since no unusual strength is required throughout the length of the cable to draw the two aircraft together into linking position. The cable 10 preferably has formed on its free end an enlarged terminal portion 12 which is considerably stronger than the remainder of the cable. It is preferred to strengthen the cable along the terminal portion forming the wing linking mechanism when the two aircraft are brought to adjacent wing tip position for the final linking operation. The extra strength in this portion of the cable is needed to support the greater tensions exerted on the cable during this portion of the linking phase, and ultimately to secure the planes firmly together in a manner to be described.

The free terminal end of the cable 12 is provided with a hook 13, for engagement with securing mechanism indicated generally as 11, and positioned on the wing tip of plane B. In order to assist in sustaining the cable in a stabilized trailing position in flight, a series of vanes 15 may be formed directly above the hook 13. A plurality of projections 16 may be formed on the enlarged portion 12 of the cable 10, serving to increase the aerodynamic drag of the cable in order to minimize erratic motion of the cable in flight. The vanes 15 and the projections 16 provide sufficient aerodynamic drag and lift to minimize or completely eliminate oscillations of the free end of the cable, and sustain the cable end in substantially horizontal flight. The roughened surfaces 16 on the cable further serve to increase the visibility of the cable to the pilot of plane B to assist the pilot in making an initial connection with the cable.

The lightness of the cable 10 diminishes the operational requirements of power and size of the reel mechanism 14 in the wing tip of plane A, for unwinding and rewinding the cable. If desired, the motions of either aircraft in flight during a reeling operation, such as are caused by atmospheric gusts may be compensated for by a simple tension control mechanism associated with the reel mechanism 14, not shown, whereby unexpected or sudden tensions exerted on the cable are transmitted to the control device rather than being sustained by the cable 10 itself. Also suitable gearing may be employed to increase the reeling tension during the final reeling-in operation.

The cable securing mechanism 11 in the wing tip of plane B is shown in FIGURE 3 of the drawings, and may comprise lower and upper guide arms 17 and 18 extending laterally from the wing tip parallel to the wing axis along its length, the guide arms being spaced one on either side of a hook grasping mechanism indicated generally as 19. The forward guide arm 17 is secured in substantially horizontal position as shown in FIGURE 4, the rearmost guide arm 18 being inclined upwardly at an angle of approximately 45° to the horizontal. The guide arm 18 is formed with a shaped guiding surface 20 at the inner end for purposes of clearing the cable grasping mechanism 19 when extended in operative position, to ensure a free movement of the cable within the guide arms to the cable grasping mechanism when first contact is made therebetween.

Both of the guide arms 17 and 18 are rigidly mounted at their inner ends upon sleeves 21 carried by shafts 22 powered by electric motors 23 to raise and lower the guide arms between operative and inoperative positions. When not in use, the guide arms are rotated downwardly by the shafts 22 to fit into recesses 24 formed within the undersurface of the wing, whereby the upper surfaces of the guide arms rest flush with the lower surface of the wing. The electric motors 23 may be provided with the usual reduction gearing not shown to effect pivotal movement of the guide arms in the manner described.

The guide arms 17 and 18 preferably are reduced in cross-section to minimize wind resistance. These arms are not subjected to severe strain in operation, serving only as guide means for directing the cable 10 inwardly towards the cable grasping mechanism 19. It is contemplated that only one guide arm 17 may be employed in some instances, or that other guide mechanisms serving the same function as the arms 17 and 18, will be employed to make the initial contact with the cable 10.

As shown in FIGURE 3, the guide arms 17 and 18 are positioned on either side of the cable grasping mechanism 19. FIGURE 4 shows this grasping mechanism, consisting of cooperable jaws 25 and 26 mounted pivotally at 27 upon a bracket 28 fixed to the surface of the wing structure. The jaws 25 and 26 are actuated between the closed position shown in FIGURE 4 and open jaw position by means of links 29 secured pivotally to each jaw at 30, and secured at the other end to a jack screw 31 actuated by an electric motor 32 set within the wing structure.

In operation, the pilot of plane B closes the electrical circuits or other means for effecting the operation of the motor 32 to open the cable grasping mechanism 19 to cable receiving position, as shown in FIGURE 5. As the plane B approaches the cable 10 in flight, the pilot maneuvers his wing whereby the cable is received between the guide arms 17 and 18, and is drawn towards the cable grasping mechanism 19. The cable grasping mechanism 19 is provided with a contact switch 33 mounted adjacent the point of pivot 27 of the jaws 25 and 26, which is contacted by the cable 10 as it enters within the open jaws 25 and 26, whereby the motor 32 is energized to effect closure of the jaws over the cable 10, in the manner shown in FIGURE 4. Included in the same electrical circuit is the motor 23 actuating the front lower guide arm 17, whereby the front guide arm retracts swinging downwardly on its point of pivot to the recess 24 within the wing. The lowering of the guide arm 17 is visible to the pilot, and is thus a clear indication that the cable grasping mechanism 19 has operated to grasp the cable 10.

Once cable contact is completed, plane B reduces speed relative to plane A until the hook 13 is drawn into the jaws 25 and 26 and is firmly engaged therewith. The rearward guide arm 18 may then be lowered by operation of suitable electrical controls energizing the proper motor 23. This may be accomplished automatically if desired, for example, by a suitable switch mechanism actuated by the exertion of lateral tension on the cable grasping mechanism 19 as by reeling in the cable 10, whereby retraction of the arm 18 is accomplished automatically.

Once the cable 10 is secured within the cable grasping mechanism 19 on plane B and the planes have taken the position shown in FIGURE 1E, the pilot of plane A actuates the reeling mechanism 14 to accomplish withdrawal of the cable within the wing tip of plane A. The cable actuating mechanism as shown in FIGURE 2 comprises a simple drum reel 34 mounted upon a shaft 35 journalled within the airplane wing structure. The reel 34 may be provided with an external gear 36 meshing with a driving gear 37 powered by a suitable electric motor 38 or other means to rotate the reel on the shaft 35. The cable 10, suitably anchored at one end to the reel, extends through a cable guide 39 mounted in the end of the wing structure. A cable brake mechanism 40 of conventional type may be provided adjacent the cable reel, to lock and secure the cable when in certain positions as for example when the cable has been reeled in sufficiently to join the adjacent wing tips of planes A and B. The cable brake 40 may be automatically actuated by a contact switch when the wing tips touch, which simultaneously stops the reeling motor.

In order to position the adjacent wing tips of the planes A and B, when in linked position and assist in the prevention of relative torsional movement, projections 41 may be formed on the end rib 42 of the wing tip of plane A, forming guide surfaces to align the end ribs accurately, fitting into recesses 43 formed on the end rib 44 of the wing tip of plane B. A sealing strip 45 on the outer end of the wing of plane B provides a flexible, air-tight joint between the two planes.

The hook 13, in operative linking position with the wings together and grasping member 19, may be drawn within the cable guide 39, the vanes 15 resting within the guide to avoid a break in the streamlined surfaces of the wing tips. When it is desired to project the cable from within the guide 39 to extend the cable for an initial linking operation, it is necessary only to actuate the winding reel 34 in clockwise direction, whereby the stiffened and enlarged portion 12 of the cable 10 will drive the hook in the mechanism free in the guide 39 sufficiently for the air flow to seize upon the vanes 15 and the projections 16 on the heavier portion 12 of the cable 10, dragging the cable out and rearwardly as it is released from the reel 34.

To effect separation of the planes, the pilot of plane B actuates motors 32 to open the cable grasping jaws 35 and 36 releasing the hook 13 therefrom, whereby the wing tips of the respective planes are free for normal flight.

In the linking operation, when the pilot of plane B approaches the rearwardly extended cable 10, it is desirable for the pilot to move his craft sideways to straddle the cable 10 with the guide arms 17 and 18, effecting a slight lateral deflection on the cable which combines with the tension or drag on the cable to force the cable home in the cable grasping device 19. It is also desirable that the pilot of plane B engage the cable forward of its free end so that the increased drag of the terminal portion 12 will assist in positioning or "bottoming" the cable in the grasping device. Once the cable has been enclosed within the grasping device and the hook engaged, the pilot of plane B takes a position abreast of the plane A as shown in FIGURE 1E for the cable reeling operation. The drag on the sagging cable softens any tendency for the cable to jerk. This drag also tends to turn the two planes slightly toward each other, an effect which must be counteracted by the rudders of the individual craft. As the wing to wing approach of the two planes continues, the cable being reeled in by plane A, lift builds up in the respective inner wing tips, creating a natural tendency for the two planes to roll away from each other slightly checking any undesirable inward momentum (FIGURE 1K). It will be seen that if for any reason, it is undesirable to continue the linking action, as the plane wing tips approach, each plane would be in a position for effecting immediate separation, upon release of the cable hook from the cable grasping mechanism 19 by the pilot in plane B.

Means may be provided for imparting flexibility to the wing tip connections of the adjacent craft. Such means form the subject of applications for patent to be filed, and may include resilient members in the wing tips whereby movement in normal bending is relatively free in the connection between the wings of the planes. Play of the wing tips is desirable for absorption of any shock which may be imparted to the linked aircraft. The need for freedom in torsion arises from the fact that adjoining planes, for instance, because of a difference in weight or a difference in wing loading if they are of different design will require different angles of attack in flight. This difference in flight characteristic may be compensated in twist across the adjoining wing tips.

Corrective action under certain flight conditions may be applied by suitable controls provided for automatic or manual operation of elevators and ailerons, maintaining the linked planes in straight alignment. By means of these several flight controls, it will be apparent that the entire fleet of joined aircraft can be operated as a unit from a single pilot control center, assisting in the maneuver and flight of the group of craft.

With three or more planes joined in the group, it will be apparent that the wing tips of the end planes normally (that is, during steady flight in static equilibrium) will incline downwardly from the horizontal as the lift on the free wing tip of an end plane will be less than the lift adjacent the joined wing tips. Thus, the end planes of the group will tend to sag, thus creating tension spanwise through the fleet, preventing the appearance of any compressive end loads within the fleet structure and particularly at the junction points of the wing tips. This tensioning of the linked fleet is particularly valuable in connection with the compensation for changes in relative alignment of individual members of the linked group, as for example, due to decrease in load, the effects of rough air and the like. The end tensions on the linked fleet further assist in immediate separation of any two linked units as in case of emergency, whereby effective and immediate control over the linked unit is maintained at all times.

Means may be provided on the adjacent wing tips for the establishment of a communication system throughout the linked group, whereby radio silence may be maintained as long as desired in the interest of security. Provision may be made for interconnection of fuel systems for purposes of refueling individual craft in the group from a central source of supply. In cases of larger types of aircraft, it may be desirable to establish interconnecting passageways for the transfer of personnel, ammunition, cargo, and the like.

The mechanism shown herein for accomplishing the linkage of two planes in flight, is given by way of example as one practical means for accomplishing the invention.

Cable 10, hook 13, cable grasping mechanism 19, cable reel 34, screw 38, and closely associated parts, collectively constitute traction means for drawing adjacent aircraft together at their wing tips. It is obvious that other traction means could be used such as ropes, telescoping actuator cylinders, jack screws, or retracting rods, together with their attachments at both ends such as latches, sockets, or pinned joints, and appropriate conventional operating parts such as motors, hydraulic pumps, hydraulic reservoirs, and so on. These would constitute equivalent traction means without departing from the spirit of the invention.

Thus, while the invention has been described with reference to the specific details shown, it is not to be limited save as defined in the appended claims.

I claim:

1. A multiple aircraft comprising two or more aircraft capable of independent flight and arranged in spanwise relationship, means in proximity to a wing tip of a first aircraft for establishing initial contact with a second aircraft while in independent flight, locking means on the second aircraft for grasping the contact means, and means in proximity to the adjacent wing tip of the first aircraft actuating the contact means for drawing the two aircraft to a wing tip to wing tip position of aerodynamic proximity in the region of adjacent wing tips.

2. A multiple aircraft comprising a plurality of winged aircraft each capable of independent sustained flight and arranged in spanwise relationship, each aircraft having a securing member in proximity to the tip of one wing extendable to establish a means of contact with another aircraft, a locking member in proximity to the tip of another wing for grasping the securing member of another aircraft, and means on each aircraft for actuating its securing member when locked in the locking member of another aircraft to draw the aircraft into a wing tip to wing tip position of aerodynamic proximity.

3. A multiple aircraft comprising a plurality of aircraft each capable of independent flight and arranged in spanwise relationship, cable means in proximity to a wing tip of a wing of a first aircraft extensible therefrom to establish a point of contact, a cable engaging and securing member on a second aircraft in proximity to an adjacent wing tip thereof, said member engaging and securing said cable connectedly, and means on the first aircraft for reeling in the cable to draw the two aircraft to a wing tip to wing tip position of aerodynamic proximity in the region of adjacent wing tips.

4. A multiple aircraft comprising a plurality of aircraft each capable of independent flight and arranged in spanwise relationship, a cable positioned in proximity to the tip of the wing of a first aircraft, means for reeling out the cable rearwardly of the first aircraft, a cable grasping member in proximity to the tip of a wing of a second aircraft, guide members adjacent the cable grasping member for straddling the cable and guiding same into the cable grasping member, and means for actuating the cable reel to draw the two aircraft to a wing tip to wing tip position of aerodynamic proximity in the region of the wing tips.

5. In the combination set forth in claim 4, said cable having a reinforced terminal portion of greater strength and rigidity than the remainder of the cable.

6. In the combination set forth in claim 4, said cable having lifting vanes on the terminal portion to minimize oscillation.

7. A multiple aircraft comprising a plurality of winged aircraft each capable of independent flight and arranged in spanwise relationship, a reel mounted in proximity to the tip of a wing of a first aircraft, a cable on the reel, means for actuating the reel to extend the cable from the wing, a cable grasping member in proximity to the tip of a wing of a second aircraft, means for actuating the cable grasping member to secure the cable while extended from the first aircraft, means for actuating the reel to withdraw the cable into the wing, said cable and reel means so actuated drawing the two aircraft together, and means for securing the cable in withdrawn position to secure adjacent wing tips of the first and second aircraft in wing tip to wing tip positions of aerodynamic proximity in spanwise extension.

8. A multiple aircraft comprising a plurality of aircraft each capable of independent, controlled flight, the aircraft being arranged wing tip to wing tip in spanwise relationship with structural flexibility and having the wing tips in aerodynamic proximity, traction means on one of said wing tips and means on the other of said wing tips connected to said traction means said traction means and said last named means cooperating to draw the aircraft together and to secure the aircraft releasably for coordinated group flight, the region of the juncture of the aircraft at the wing tips being devoid of extraneous drag producing forms.

9. In a multiple aircraft comprising a plurality of aircraft each capable of independent controlled flight, means for linking aircraft spanwise in wing tip to wing tip relation comprising a cable normally trailing rearwardly of the wing tip of a first aircraft, a cable grasping member on the adjacent wing tip of a second aircraft, means for actuating the cable grasping member to secure the cable therein, a reel device in the first aircraft for reeling in the secured cable, to draw the adjacent wing tips of the first and second aircraft into aerodynamically proximate positions, a brake for securing the cable in holding position, and means in the second aircraft for actuating the cable grasping member to release the cable, breaking the connection between the wing tips of the aircraft.

10. A multiple aircraft composed of individual winged units, each capable of independent flight, each unit having traction means at a lateral extremity thereof for connection in flight to grasping means on a lateral extremity of an adjacent unit whereby said traction means and said last named means cooperate to draw adjacent units together.

11. A multiple aircraft comprising a plurality of individual aircraft, each capable of independent flight, a retractable traction member in the wing tip of one aircraft and connecting means in the wing tip of another aircraft, said traction member and connecting means cooperating together to draw the aircraft together in a wing tip to wing tip relation whereby the induced drag of each of the individual aircraft is reduced.

12. A multiple aircraft comprising at least two individual aircraft capable of independent flight and arranged in spanwise relationship, means attached to a wing tip of one of said individual aircraft for establishing contact in flight with another of said individual aircraft, means attached on the adjacent wing tip of the other of said individual aircraft for engaging and securing said contact means, and retracting means attached to one of said individual aircraft for retracting said engaged and secured contacting means, thereby drawing said individual aircraft together wing tip to wing tip.

References Cited by the Examiner
UNITED STATES PATENTS

| | | | |
|---|---|---|---|
| 336,829 | 2/1886 | Winter | 114—235 |
| 1,818,138 | 8/1931 | Howland | 244—3 |
| 1,869,506 | 8/1932 | Richardson | 244—110 |
| 2,193,312 | 3/1940 | Cobham. | |
| 2,388,013 | 10/1945 | Rasor | 244—3 |
| 2,421,742 | 6/1947 | Buetner | 244—2 |
| 2,480,145 | 8/1949 | Lazarus et al. | 244—3 |
| 2,496,087 | 1/1950 | Fleming | 244—2 |

FOREIGN PATENTS

| | | |
|---|---|---|
| 297,992 | 6/1932 | Italy. |
| 546,587 | 7/1942 | Great Britain. |
| 566,201 | 12/1944 | Great Britain. |

MILTON BUCHLER, *Primary Examiner.*

MILTON L. MARLAND, SAMUEL BOYD, FERGUS S. MIDDLETON, *Examiners.*